United States Patent [19]

Schellekens et al.

[11] Patent Number: 5,498,371

[45] Date of Patent: Mar. 12, 1996

[54] PROCESS FOR THE PRODUCTION OF AN ASSEMBLY CONDUCTING ARTICLE

[75] Inventors: Ronald M. A. M. Schellekens, Meerssen, Netherlands; Hans K. Van Dijk, Santa Barbara, Calif.

[73] Assignee: DSM N.V., Heerlen, Netherlands

[21] Appl. No.: 309,609

[22] Filed: Sep. 21, 1994

Related U.S. Application Data

[63] Continuation of Ser. No. 998,296, Dec. 30, 1992, abandoned.

[30] Foreign Application Priority Data

Dec. 30, 1991 [NL] Netherlands ............... 9102188

[51] Int. Cl.$^6$ ............... H01B 1/00; H01B 1/12
[52] U.S. Cl. ............... 252/500; 252/518; 264/104; 264/216; 264/231; 528/422; 528/377
[58] Field of Search ............... 252/500, 518, 252/519; 264/104, 216, 231; 528/422, 423, 424, 377, 378

[56] References Cited

U.S. PATENT DOCUMENTS

| | | | |
|---|---|---|---|
| 4,868,284 | 9/1989 | Murase et al. ............... | 252/518 |
| 4,987,042 | 1/1991 | Jonas et al. ............... | 429/213 |
| 5,028,354 | 7/1991 | Smith et al. ............... | 252/500 |
| 5,217,650 | 6/1993 | Theophilou et al. ............... | 252/500 |
| 5,385,956 | 1/1995 | Schellekens et al. ............... | 522/116 |

FOREIGN PATENT DOCUMENTS

| | | |
|---|---|---|
| 0206414 | 6/1986 | European Pat. Off. . |
| 314311 | 5/1989 | European Pat. Off. . |
| 3611706 | 10/1987 | Germany . |
| 3903973 | 8/1990 | Germany . |
| 324120 | 2/1991 | Japan . |

*Primary Examiner*—Paul Lieberman
*Assistant Examiner*—M. Kopec
*Attorney, Agent, or Firm*—Cushman Darby & Cushman

[57] ABSTRACT

The invention relates to a process for the production of an electrically conducting article, in which process a polymer composition, comprising a carrier polymer, is stretched and, during stretching of the polymer composition, polymerisation of monomers takes place to form a conjugated polymer, characterised in that the polymer composition contains precursor monomers prior to stretching and the monomers are obtained by activating precursor monomers during the stretching step. It has been found that using the process according to the invention articles can be obtained which, in addition to good electrically conducting properties, also have good mechanical properties.

11 Claims, No Drawings

PROCESS FOR THE PRODUCTION OF AN ASSEMBLY CONDUCTING ARTICLE

This is a continuation of application No. 07/998,296, filed on Dec. 30, 1992, which was abandoned.

The invention relates to a process for the production of an electrically conducting article, in which process a polymer composition, comprising a carrier polymer, is stretched and, during stretching of the polymer composition, polymerisation of monomers takes place to form a conjugated polymer.

A process of this type is disclosed in European Patent Publication EP-A-314311. The process according to this patent publication comprises the polymerisation of monomers present in the polymer composition to give a conjugated polymer. An article is thus obtained which contains both a carrier polymer and a conjugated polymer. It is also pointed out that it will be possible to obtain good mechanical properties of the article if the polymer composition is stretched during polymerisation.

It has been found that in order to obtain articles which have both good mechanical properties and good electrically conducting properties it is necessary to allow the stretching step and the polymerisation of the monomers to proceed substantially simultaneously.

However, with the process according to the prior art it is not readily possible to allow these two process steps to proceed simultaneously. The reason is the fast rate of the polymerisation reaction of the monomers. At the temperatures prevailing during the stretching step, the polymerisation reaction proceeds instantaneously. In view of the relatively long time which is needed for the stretching step, it is impossible to allow the two processes to proceed simultaneously over a prolonged period. In general, in the known process, the polymerisation reaction is already complete while the major part of the stretching step still has to take place. In practice, the bulk of the stretching step is thus found to take place after polymerisation of the monomers, as a result of which the desired combination of properties is not obtained.

Thus, it is not possible to produce an article which has both good mechanical properties and good electrically conducting properties by the abovementioned process. The object of the present invention is to provide a process for the production of an electrically conducting article which has this desired combination of properties.

This is achieved by means of the process according to the invention, in that the polymer composition contains precursor monomers prior to stretching and the monomers are obtained by activating precursor monomers during the stretching step.

The precursor monomers are activated during the stretching step, for example by means of a heat treatment or a photochemical treatment, and converted to polymerisable monomers. Polymerisation of the monomers thus obtained to give a conjugated polymer then takes place. It has been found that the process for activation of the precursor monomers proceeds gradually.

The activation of the precursor monomers is preferably carried out by the action of heat, by allowing stretching of the composition to take place at elevated temperature. The stretching temperature chosen determines the rate at which the activation of the precursor monomers takes place. By this means it has become possible to allow the polymerisation reaction of the resulting monomers also to proceed in a readily controllable manner, as a result of which the stretching step and the polymerisation reaction can proceed simultaneously. Therefore, the process according to the invention results in articles which, in addition to good mechanical properties, also have good electrically conducting properties. Examples of such articles are fibres, films, tapes, sheets and strips.

The lower limit of the temperature during the stretching step is, on the one hand, determined by the minimum permissible temperature at which the carrier polymer can be effectively stretched and by the activation temperature of the precursor monomers. The temperature during the stretching step is generally above the glass transition temperature and below the melting point of the carrier polymer. Preferably, the temperature is just below the melting point of the carrier polymer. On the other hand, the temperature during the stretching step is limited by the thermal degradation of the monomers and the conjugated polymers formed. This degradation usually increases at elevated temperature.

A person skilled in the art can easily select the most suitable temperature, depending on the polymer composition chosen. Usually a temperature of between 40° and 300° C. is used and the temperature is preferably between 70° and 200° C. During stretching, a pressure between 0.01 atm. and the ambient pressure is usually applied. If a relatively low pressure is used, stretching at a lower temperature is possible. The stretching step is usually carried out over a period which is between 2 seconds and 10 minutes, preferably between 10 seconds and 2 minutes. Activation can also take place in any other way suitable for the given situation, for example by photochemical means.

It can be particularly advantageous to use a temperature gradient during the stretching step. This means that the temperature varies during the stretching step, as a result of which the activation reaction of the precursor monomers is started at a precisely defined point in time during the stretching step. Prior to this point in time, the polymer composition can already be stretched to some extent, if desired, for example at a temperature between 20° and 50° C., whilst from the point in time at which activation takes place the stretching step and the polymerisation of the monomers proceed simultaneously. By this means an accurate control is obtained with regard to the formation of the conjugated polymer. In addition, the orientation of the carrier polymer can be accurately controlled.

Depending on the conjugated polymer formed, the electrical conductance of the article can be brought to the desired level, by means of an (oxidative or reductive) doping step, in which step use is made of the generally known doping techniques and reagents. These are given, for example, in the Handbook of conducting polymers, T. A. Skotheim, Marcel Dekker Inc., New York, USA (1986).

The process according to the invention is based on a polymer composition which contains a carrier polymer as well as a precursor monomer. Usually, the composition also contains a suitable polymerisation catalyst.

According to the invention, a precursor monomer means a molecule which, as such, is not able to polymerise under the reaction conditions used for the activation, even in the presence of a polymerisation catalyst. After a simple conversion step, however, this molecule is converted into a polymerisable monomer. This conversion step can involve the removal of a blocking group, which covers one or more reactive sites of the precursor monomer. It is also possible for an electron-attracting group, which increases the oxidation potential of the precursor monomer, as a result of which polymerisation is prevented, to be removed. In another embodiment of the process according to the invention, an intramolecular reaction, such as, for example, a retro-Diels- Alder reaction, takes place in order to convert the precursor monomer to a polymerisable monomer. Any precursor monomer which, after activation, forms a polymerisable monomer which polymerises to give a conjugated polymer is suitable for use in the process according to the invention. For example, precursor monomers which have a structure in accordance with Formula (I) are outstandingly suitable for use.

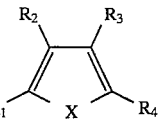

Formula (I)

wherein
X is

—S— or —O—;

$R_1$ is hydrogen, —C(O)OH, —C(O)C(O)OH, —$SO_3$H, —C(O)H, —I or —Br;

$R_2$ is hydrogen, an alkyl group (having 1–10 carbon atoms), —C(O)OH or a halogen;

$R_3$ is hydrogen, an alkyl group (having 1–10 carbon atoms), —C(O)OH or a halogen; and $R_4$ is hydrogen, —C(O)OH, —C(O)C(O)OH, —$SO_3$H, —C(O)H, —I or —Br;

on condition that $R_1$ and $R_4$ are not all simultaneously hydrogen.

All combinations of X, $R_1$, $R_2$, $R_3$ and $R_4$ are possible. The $R_4$ groups can be removed by the action of heat or photochemically, with the formation of a pyrrole, thiophene or furan monomer, which is optionally substituted in the $R_3$ position. This precursor monomer is thus activated and can then polymerise freely via the $R_1$ and the $R_4$ position. The $R_2$ and $R_3$ groups can be identical or different. Preferably, pyrrole-2-carboxylic acid is used. The synthesis of this precursor monomer is described in J. Am. Pharm. Assoc. 45, 509 (1956).

Other suitable precursor monomers from which a conjugated polymer can be prepared are precursor monomers which have a structure in accordance with Formula (II):

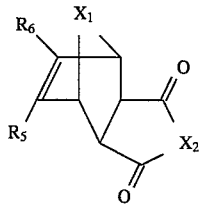

wherein
$X_1$ and $X_2$ are identical or different and are

—S— or —O—;

$R_5$ and $R_6$ are identical or different and are hydrogen or an alkyl group having 1–10 carbon atoms; and $R_4$ is hydrogen or an alkyl, aryl or alkoxy group.

The precursor monomers according to Formula (II) can, for example, be synthesised as described in J. Chem. Soc. Perkin Trans. I (1985), pp. 1277–1284.

Other examples of suitable precursor monomers are 2-aminobenzoic acid and 4-aminobenzoic acid, described by P. Ruelle, J. Chem. Soc. Perkin Trans. II, 1953 (1986). 3,4-Disubstituted thiophenes are also suitable for use in the process according to the invention. These thiophenes, and the process by which they can be prepared, are described, for example, in U.S. Pat. No. 4,987,042 and can be represented with the aid of Formula

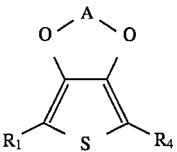

Formula (III)

wherein A is an optionally substituted $C_1$–$C_4$ alkyl chain.

The process according to the invention is not restricted to the use of precursor monomers of a single type. In the process according to the invention it is also readily possible to use combinations of different types of precursor monomers. Optionally, precursor oligomers, such as, for example, dimers or trimers, can also be used.

Any stretchable polymer can be chosen as carrier polymer. Such polymers are well known to those skilled in the art and those skilled in the art are therefore able to select the correct carrier polymer, depending on the finally desired properties of the article. Suitable carrier polymers are, for example, polyolefins, such as, for example, polyethene, polypropene or ultra-high molecular weight polyethene (UHMWPE), polyvinyl alcohol, polyvinyl chloride, polyvinyl acetate, polyesters, such as, for example, polyalkene terephthalates, polystyrene, polyethylene oxide, polyamides, such as nylon-4,6, nylon-6 or nylon-6,6, polyvinylidene chloride and mixtures of these polymers. It is also possible to use thermoplastic copolymers. UHMWPE is preferably used. The weight-average molecular weight of the carrier polymer used can vary within wide limits. Preferably, this molecular weight is greater than 100,000. If ultra-high molecular weight polyethene is used as the carrier polymer, the weight-average molecular weight is preferably greater than 1,000,000.

The desired weight ratio between the amount of carrier polymer and the final amount of electrically conducting polymer, and thus, implicitly, the amount of precursor monomer, is a consequence of the optimalisation between the desired electrically conducting properties on the one hand and the desired mechanical properties on the other hand. Relatively high concentrations of carrier polymer have an adverse effect on the conductivity of the final article, whilst relatively low concentrations of carrier polymer can have an adverse effect on the desired mechanical properties. The molecular weight, the structure and the degree of branching of the carrier polymer determine the mechanical properties to a significant degree.

Preferably, a homogeneous distribution of the electrically conducting properties in the final product is achieved; to this end, the precursor monomers must be dispersed as homogeneously as possible in the polymer composition, which can be achieved by using a porous carrier material. It is therefore preferred to use a porous moulding composition. A porous moulding composition of this type can, for example, be obtained by spinning from a polymer solution or a melt. The so-called gel-spinning process is also a suitable process. A review of such techniques is given, for example, in Encyclopedia of Polymer Science and Engineering (1986), John Wiley and Sons, New York, vol. 6, pp. 802–825. A homogeneous distribution of the precursor monomers can be achieved, for example, by first producing a porous moulding composition of the carrier polymer, after which the precursor monomers are introduced into this composition. This can be effected, for example, by impregnating the carrier polymer in a liquid which contains the precursor monomers. It is also readily possible first to add precursor monomers to a polymer solution, and then to use the abovementioned spinning techniques.

Preferably, a suitable polymerisation catalyst is added to the composition. If desired, a solution of the catalyst can be used. The choice of catalyst is determined by the monomer which is formed after activation. Examples of suitable catalysts are compounds which contain a transition metal, in particular Fe, Co, Sn, Ru, Cu or Ni, such as, for example, $FeCl_3$, $CuCl_3$, $Fe(p\text{-toluenesulphonate})_3$ and $Cu(NO_3)_2$, but Ziegler-Natta catalysts and compounds such as $K_2Cr_2O_7$ and $(NH_4)_2S_2O_8$ are also well effective in certain polymerisation reactions. If the conjugated polymer formed during the process according to the invention is polypyrrole, it is preferred to use $FeCl_3$, $Cu(NO_3)_2$ or $Fe(p\text{-toluenesulpho-nate})_3$ as catalyst. Since these catalysts also serve as doping reagent, the separate addition of such a reagent is avoided. It can yield particular advantages if a solution which contains both the precursor monomer and the catalyst is used in the process according to the invention. By this means, for example, the separate addition of the catalyst is avoided.

It is generally known that the mechanical properties of polymer articles, such as, for example, fibres, films, sheets, tapes and strips, are appreciably improved if these articles are stretched. An increase in the degree of stretching generally results in an improvement in the mechanical properties. This effect is described, for example, by I. M. Ward in Developments in Oriented Polymers-2, Elsevier Applied Science, New York (1987). In particular, the modulus of elasticity and the tensile strength of such articles are appreciably improved by a stretching step. The stretching step can, if desired, be a uniaxial or a biaxial stretching step. The stretching step according to the invention can, for example, be carried out with the aid of a heated stretching plate. It is also possible to stretch in a heated oven or in a heated liquid. A review of suitable processes is given in Encyclopedia of Polymer Science and Engineering (1986), John Wiley and Sons, New York, vol. 6, pp. 802–825.

Within the framework of the invention, good conducting properties are understood to mean that the specific conductivity, determined in accordance with the so-called four-point method, is at least 0.01 S/cm, preferably at least 0.1 S/cm. The four-point method is described, for example, in EP-A-314311. A more detailed description is given in H. H. Wieder, Laboratory Notes on Electrical and Galvanomagnetic Measurements, Chapter 1, Elsevier, New York, 1979. The specific conductivity:

$$\sigma = (L/A) * (1/R),$$

where $\sigma$=specific conductivity [S/cm],

L=distance between the two innermost electrodes [cm],

R= resistance [ohm], and

A=transverse surface area [$cm^2$]

is determined with the aid of this method.

The tensile strength and the modulus of elasticity of the articles which are obtained in the processes according to the examples and the comparative experiments were determined at a temperature of 23° C. and at a relative atmospheric humidity of 65%, with the aid of a Zwick 1435 tensile tester. For these determinations, the clamped length was 25 mm and the pulling speed 2.5 m/min. The modulus of elasticity was determined from the initial contact line of the recorded stress-strain curve (Young's modulus). The weight of the fibre per unit length, or the titre of the fibre, was determined by weighing fibre sections 10 cm in length.

The invention is further illustrated with the aid of the following examples and comparative experiments, without the invention being restricted thereto.

EXAMPLES AND COMPARATIVE EXPERIMENTS

Example I a: Preparation of porous UHMWPE filaments 3 grams of UHMN-PE (Himont, type MB 312, $M_w$=2000 kg/mol) were added at a temperature of 23° C. to 150 ml of paraffin oil. 30 mg of di-tert-butyl-p-cresol (DBPC) were also added. Reduced pressure was applied to the suspension thus obtained for 30 minutes in order to remove entrained air. The suspension was then heated to a temperature of 160° C., with stirring. After 90 minutes, a homogeneous solution of the polymer in the paraffin oil was obtained.

The hot polymer solution was transferred to a double-walled cylinder, which was thermostat-controlled at 160° C. Using a suction device, the solution was spun at a rate of 129 ml/hour through a capillary (cross-section 1.0 mm) into a quench bath (tetrahydrofuran (THF), 20° C.). The distance between the spinning head and the quench bath was 15 mm. The filaments obtained were then extracted intensively with tetrahydrofuran (soxhlet extraction) for 8 hours and finally stored in tetrahydrofuran.

b: Impregnation and stretching 750 mg of pyrrole-2-carboxylic acid were dissolved in 4.5 ml of tetrahydrofuran, so that a clear brown solution was obtained. 2.1 g of $FeCl_3$ (anhydrous) were then dissolved in methanol (MeOH, 20° C.), so that an orange solution was obtained. The two solutions obtained were mixed, which resulted in a clear red-brown solution. The wet, porous UHMW-PE filaments (see A) were placed in this solution for 72 hours.

The fibres moistened in this way were then dried in air for 3 minutes and subsequently stretched for 15 seconds on a thermostatically controlled hot stretching plate at a temperature of 100° C. The degree of stretching was determined by measuring the displacement of marker bars which had been applied. This experiment was carried out a number of times, different degrees of stretching being used. The degrees of stretching ($\lambda$) which were used were 5, 10, 20 and 40. During stretching the fibres gradually became black in colour, which indicated the formation of polypyrrole. After stretching, the fibres were washed with acetone and dried.

Both the electrical and the mechanical properties of the resulting fibres were determined. The results are shown in Table 1.

TABLE 1

| Electrical and mechanical properties | | | | |
|---|---|---|---|---|
| Degree of stretching ($\lambda$) | 5 | 10 | 20 | 40 |
| specific conductivity [S/cm] | 0.3 | 0.8 | 0.6 | 0.5 |
| modulus [g/den] | 10.5 | 8.2 | 35.0 | 152.0 |
| tensile strength [g/den] | 0.35 | 0.47 | 2.1 | 4.2 |
| elongation at break [%] | 50.8 | 13.2 | 26.4 | 4.6 |

Example II

UHMWPE filaments were produced analogously to Example IA. A solution of 375 mg of pyrrole-2-carboxylic acid in 4.5 ml of TMF and a solution of 1.1 gram of $FeCl_3$ in 4.5 ml of MeOH were then prepared. The two solutions were added together, after which the filaments were placed in the resulting solution for 1 hour.

The fibres moistened in this way were dried in air for 3 minutes and then stretched for 15 seconds at a temperature of 100° C. The degrees of stretching ($\lambda$) which were used were 40 and 50. During stretching, the fibres gradually became black in colour. After stretching, the fibres were washed with acetone and dried.

Both the electrical and the mechanical properties of the resulting fibres were determined. The results are shown in Table 2.

TABLE 2

| Electrical and mechanical properties | | |
|---|---|---|
| Degree of stretching ($\lambda$) | 40 | 50 |
| specific conductivity [S/cm] | 0.3 | 0.25 |
| modulus [g/den] | 140.0 | 133.0 |
| tensile strength [g/den] | 5.1 | 7.0 |
| elongation at break [%] | 6.5 | 13.0 |

Comparative Experiment A

UHMWPE filaments were produced analogously to Example IA. These filaments were placed for 24 hours in a catalyst solution of 42 grams of $FeCl_3$ in 180 ml of THF. The fibres were then stretched immediately in a pyrrole bath for 15 seconds at a temperature of 100° C., polymerisation occurring instantaneously, which could be seen from the instantaneous black discoloration of the fibres. The resulting fibres were washed with acetone and dried in air. Both the electrically conducting and the mechanical properties of the resulting fibres were determined; see Table 3.

TABLE 3

| Electrical and mechanical properties | |
|---|---|
| Degree of stretching ($\lambda$) | 40 |
| specific conductivity [S/cm] | 0.06 |
| modulus [g/den] | 13.0 |
| tensile strength [g/den] | 0.8 |
| elongation at break [%] | 131.0 |

It can be seen from Examples I and II that, using the process according to the invention, articles can be obtained which, in addition to good electrically conducting properties, also have good mechanical properties when precursor monomers are used.

It can be seen from Comparative Experiment A that if precursor monomers are not used in the process according to the invention, the electrically conducting properties are significantly impaired. It is thus not possible to obtain the desired combination of properties. If precursor monomers are not used, the process for polymerisation of the monomers and the stretching step do not have an adequate time overlap, as a result of which it is not possible to obtain the desired combination of properties.

We claim:

1. A process for producing an electrically conducting stretched article comprising:

providing a composition comprising (i) a stretchable carrier polymer which is selected from the group consisting of polyethylene, polypropylene, polyvinyl alcohol, polyvinyl chloride, polyvinyl acetate, polyalkene terephthalate, polystyrene, polyethylene oxide, polyamide, polyvinylidene chloride and mixtures thereof, (ii) precursors to monomers which are polymerizable to a conjugated polymer in the presence of a polymerization catalyst, and (iii) a polymerization catalyst for the monomers, wherein a said precursor monomer is a compound represented by formula (I):

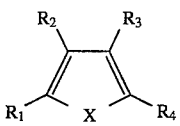

wherein in formula (I) X represents,

—S— or —O—, $R_1$ represents hydrogen, —C(O)OH, —C(O)C(O)OH, —$SO_3$H, —C(O)H, —I or —Br, $R_2$ represents hydrogen, an alkyl group having 1–10 carbon atoms, —C(O)OH or a halogen, $R_3$ represents hydrogen, an alkyl group having 1–10 carbon atoms, —C(O)OH or a halogen, and $R_4$ represents hydrogen, —C(O)OH, —C(O)C(O)OH, —$SO_3$H, —C(O)H, —I or —Br, wherein $R_1$ and $R_4$ are not both simultaneously hydrogen;

a compound represented by formula (II)

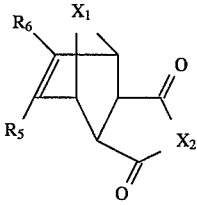

wherein in formula (II)

$X_1$ and $X_2$ are identical or different and are

—S— or —O—, $R_5$ and $R_6$ are identical or different and represent hydrogen or an alkyl group having 1–10 carbon atoms, and $R_7$ represents hydrogen or an alkyl, aryl or alkoxy group;

a compound represented by formula III

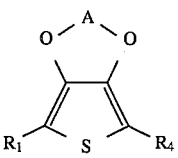

wherein in formula (III) A represents a substituted or unsubstituted $C_1$–$C_4$ alkyl chain, wherein $R_1$ and $R_4$ are not both simultaneously hydrogen; or a benzoic acid selected from the group consisting of 2-aminobenzoic acid and 4-aminobenzoic acid; and stretching the composition while activating the precursors whereby the monomers form and polymerize in the presence of the catalyst; and, optionally, doping to increase the electrical conductivity thereof.

2. A process according to claim 1, wherein the precursors are activated at an elevated temperature.

3. A process according to claim 2, wherein a temperature gradient is established during the stretching step.

4. A process according to claim 3, wherein during said stretching step the temperature is between 40° and 300° C.

5. A process according to claim 1, wherein the precursors comprise pyrrole-2-carboxylic acid.

6. A process according to claim 5, wherein the polymerization catalyst is selected from the group consisting of $FeCl_3$, $Cu(NO_3)_2$ and $Fe(p\text{-toluenesulphonate})_3$.

7. A process according to claim 1, wherein the stretchable carrier polymer is an ultra-high molecular weight polyethylene.

8. A process for producing an electrically conducting stretched article according to claim 1, wherein said precursor monomer is a compound represented by formula (I).

9. A process for producing an electrically conducting stretched article according to claim 1, wherein said precursor monomer is a compound represented by formula (II).

10. A process for producing an electrically conducting stretched article according to claim 1, wherein said precursor monomer is a compound represented by formula (III).

11. A process for producing an electrically conducting stretched article according to claim 1, wherein said precursor monomer is 2-amino benzoic acid or 4-amino benzoic acid.

* * * * *